(12) United States Patent
Tchigevsky et al.

(10) Patent No.: US 12,445,818 B2
(45) Date of Patent: Oct. 14, 2025

(54) METHODS AND ARRANGEMENTS FOR SERVICE ADVERTISEMENTS

(71) Applicant: Intel Corporation, Santa Clara, CA (US)

(72) Inventors: Izoslav Tchigevsky, Haifa (IL); Arnaud Pierres, Menlo Park, CA (US); Oren Haggai, Kefar Sava (IL); Muthu Kumar, Hillsboro, OR (US); Karthik Malurpatna Chamaraj, San Jose, CA (US); Hakan Magnus Eriksson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 697 days.

(21) Appl. No.: 17/561,308

(22) Filed: Dec. 23, 2021

(65) Prior Publication Data
US 2022/0116757 A1 Apr. 14, 2022

(51) Int. Cl.
*H04W 4/50* (2018.01)
*H04L 67/51* (2022.01)
*H04W 4/80* (2018.01)
*H04W 8/26* (2009.01)

(52) U.S. Cl.
CPC ............. *H04W 4/50* (2018.02); *H04L 67/51* (2022.05); *H04W 4/80* (2018.02); *H04W 8/26* (2013.01)

(58) Field of Classification Search
CPC .......... H04W 4/50; H04W 4/80; H04W 8/26; H04W 84/12; H04L 67/51
USPC ........................................... 455/414.1
See application file for complete search history.

(56) References Cited

U.S. PATENT DOCUMENTS

| | | | |
|---|---|---|---|
| 9,265,080 B1 * | 2/2016 | Palin | H04W 76/15 |
| 2018/0329660 A1 * | 11/2018 | Ito | G06F 3/1292 |
| 2019/0159000 A1 * | 5/2019 | Ilami | G06Q 30/0251 |
| 2021/0409923 A1 * | 12/2021 | Kumar | H04L 12/4633 |
| 2022/0060872 A1 * | 2/2022 | Liu | H04W 76/10 |
| 2022/0179665 A1 * | 6/2022 | Rathod | G06F 9/451 |
| 2023/0058549 A1 * | 2/2023 | Menon | H04W 76/11 |

FOREIGN PATENT DOCUMENTS

WO    WO-2020105046 A1 *   5/2020

* cited by examiner

Primary Examiner — Hirdepal Singh
(74) Attorney, Agent, or Firm — KDW FIRM PLLC

(57) ABSTRACT

Logic to cause transmission of a first generic attribute profile (GATT) advertisement comprising a first address associated with the service provider. Logic to generate a second non-GATT advertisement comprising a second address, an encoded personalized identifier (ID), and a payload comprising the first address. Logic to cause transmission of the second non-GATT advertisement. Logic to receive, from a scanner device, a request for the service associated with the first address. Logic to receive a first GATT advertisement for a service provider comprising a first address associated with the service provider. Logic to receive a second non-GATT advertisement comprising a second address, an encoded personalized ID, and a payload, wherein the payload comprises the first address. Logic to decode the encoded personalized ID and associate the personalized ID with the service provider. And logic to request, from an advertisement device that transmitted the first GATT advertisement.

25 Claims, 11 Drawing Sheets

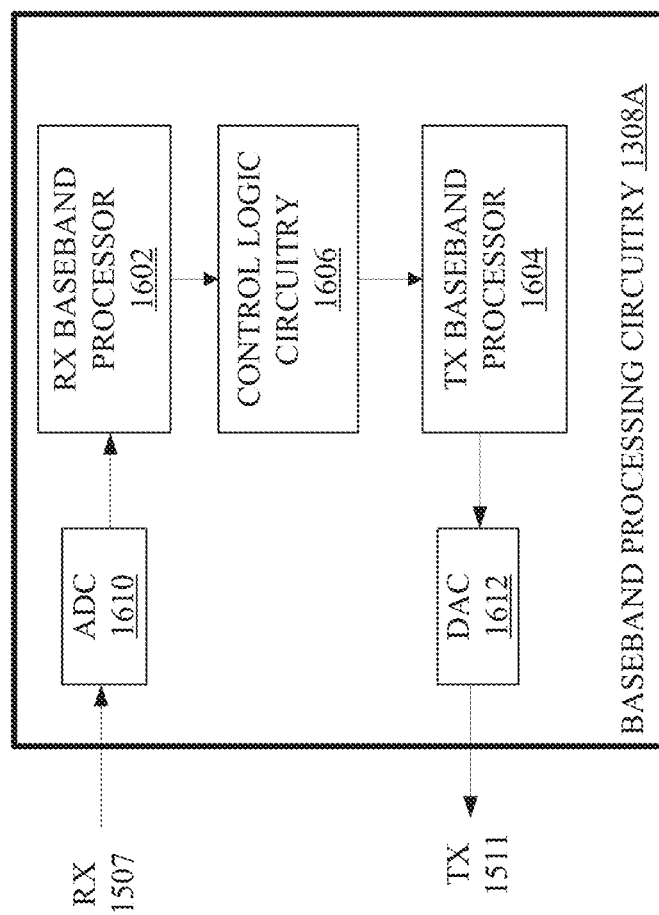

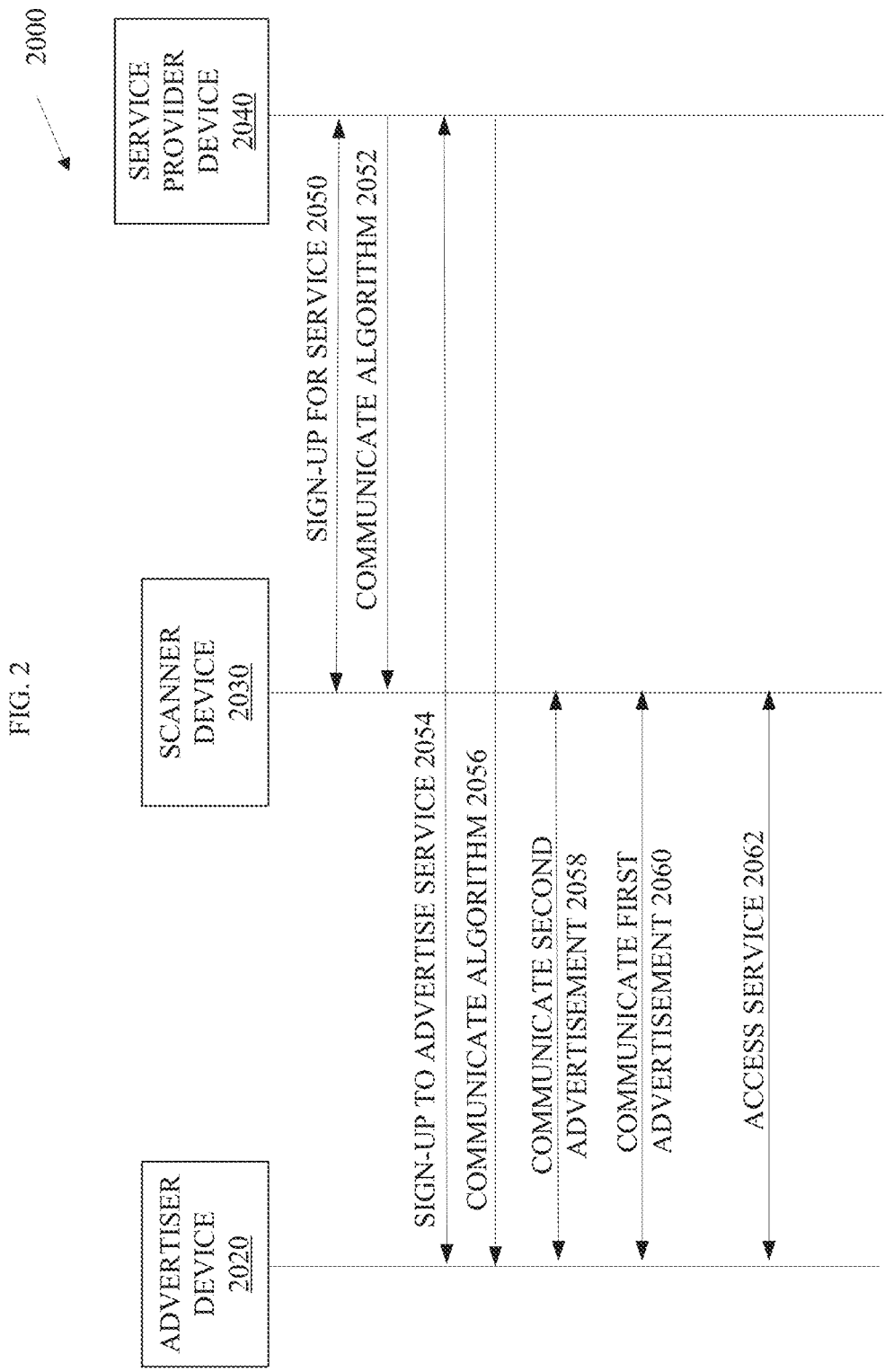

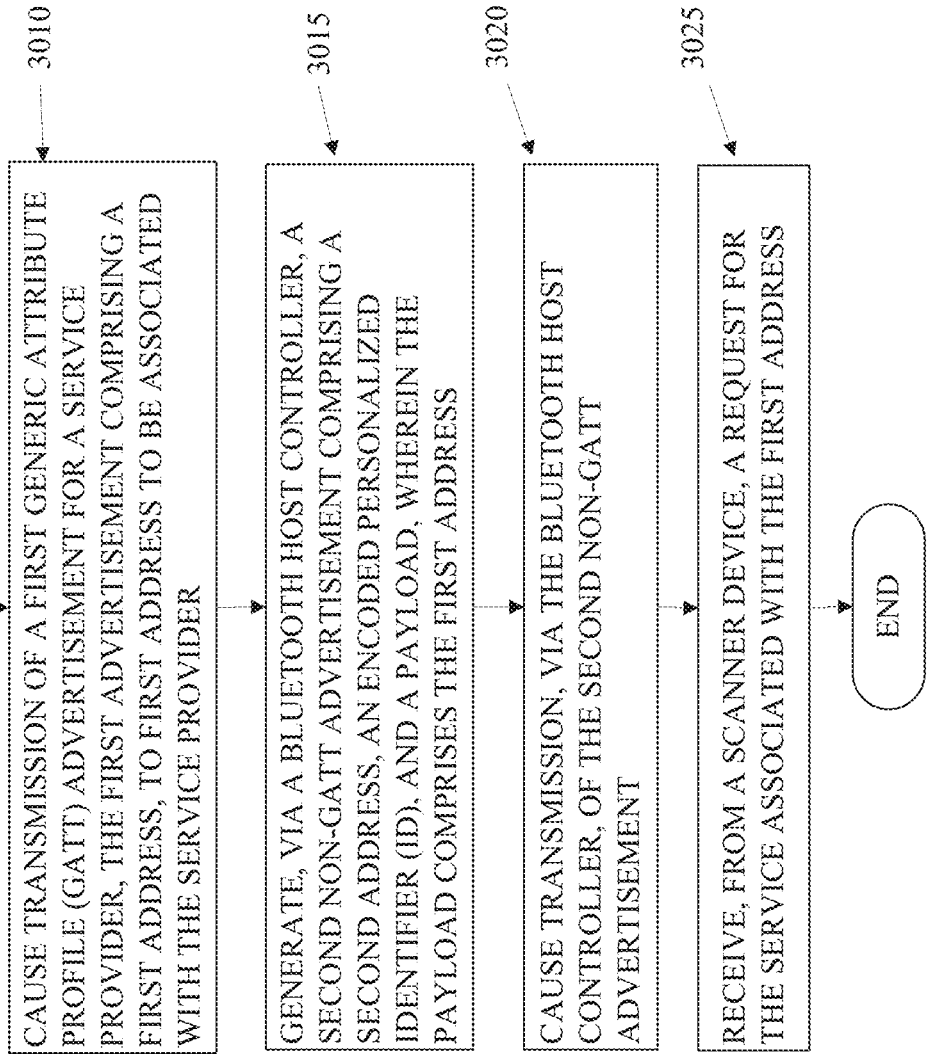

METHODS AND ARRANGEMENTS FOR SERVICE ADVERTISEMENTS

TECHNICAL FIELD

This disclosure generally relates to systems and methods for wireless communications and, more particularly, to implement a host offloaded advertisement frame to identify a service advertised in a host advertisement frame.

BACKGROUND

Bluetooth is a commonly used technology for wireless connectivity between devices. Low Energy (LE) Bluetooth Advertisement is one of the most popular device discovery, and connectionless data publishing technologies in the market. Most of LE Bluetooth devices use GATT Server layer to provide additional information and services. De-facto GATT services is the way to collaborate between LE devices. However, the technology has several limitations.

One of the major limitations of GATT services in LE Bluetooth devices is limited size of payload for advertised services via primary channels—31 bytes. An additional limitation is that services of the device were published in single advertisement packet. These limitations are solved by recent versions of Bluetooth LE standard by Extended Advertisement mechanisms that allow larger advertisement packets, in secondary advertising channels and multiple advertisement per device (Advertisement sets). However, the new technology does not support hundreds of millions of devices that already deployed to the market and that cannot be upgraded to new standard.

BRIEF DESCRIPTION OF THE DRAWINGS

FIG. 1F illustrates an embodiment of baseband processing circuitry of a wireless interface for devices, such as the devices in FIGS. 1A-B, to implement advertisement logic circuitry.

FIG. 2 depicts an embodiment of an interaction diagram to implement advertisement logic circuitry.

FIG. 3 depicts an embodiment of a flowchart to implement advertisement logic circuitry.

DETAILED DESCRIPTION OF EMBODIMENTS

Figure 1A:
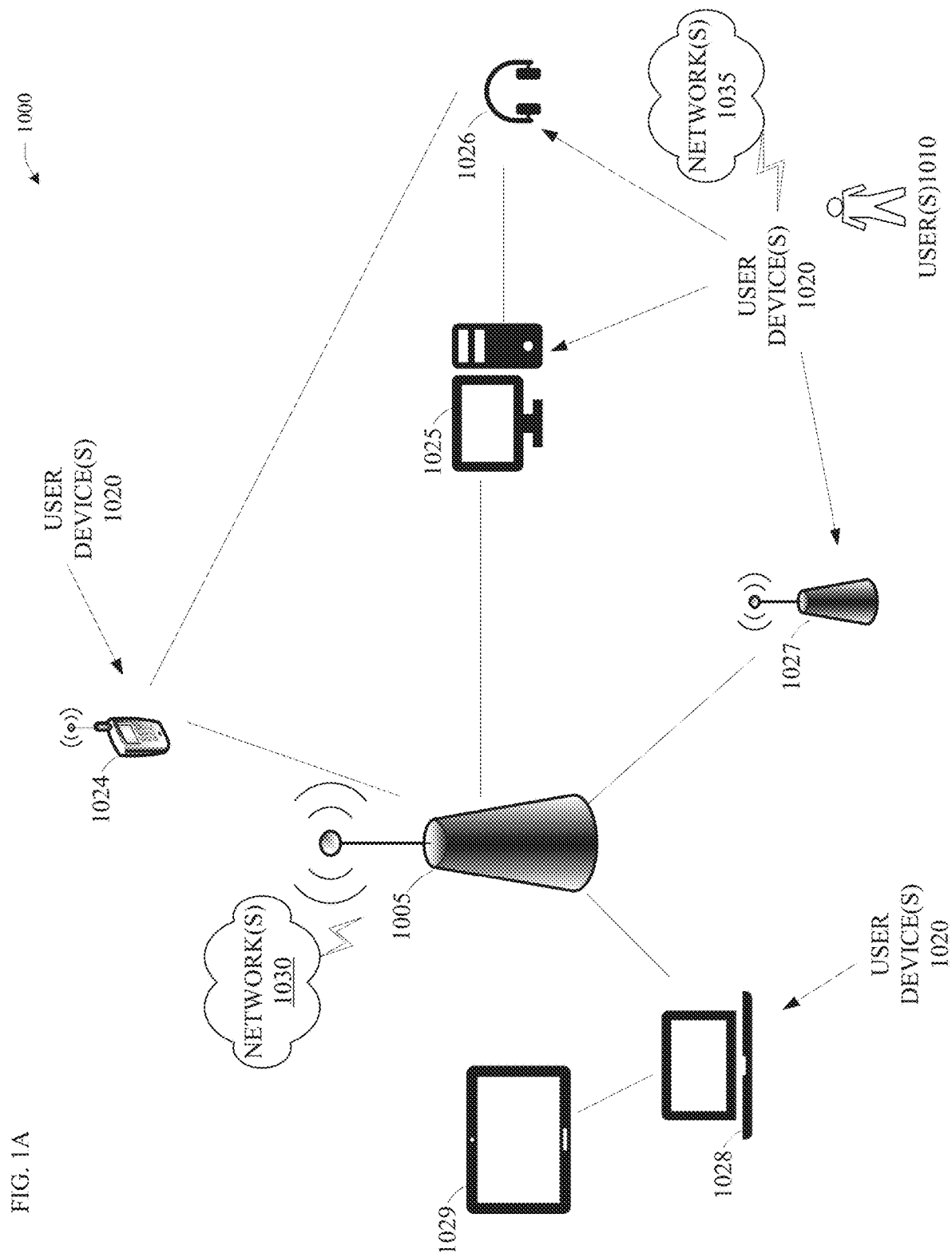
FIG. 1A depicts a system diagram illustrating an embodiment of a network environment for advertisement logic circuitry, in accordance with one or more example embodiments.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Embodiments may support legacy Bluetooth (BT) low energy (LE) discovery by implementing a first generic attribute profile (GATT) advertisement for a service provided by a service provider via a host application processor or of the advertiser device. The host application processor may generate the GATT advertisement with an address for the service (e.g., ADDR1) that is rotated or changed periodically, such as every 15 minutes. Advertisement logic circuitry of the host BT controller of the advertiser device may generate a second, host offloaded advertisement that references the first advertisement while maintaining the privacy of the service provider.

Many of applications using BT LE discovery requires secured identification of a device before performing data exchange with the device. In order to achieve secured identification, devices require publication of an identifier (ID) that can be used for device authentication. This ID use some signing technology allowing trusted recognition of the device during discovery. Publishing the ID shall not break the privacy of device owner, so a security requirement involves changing the ID periodically to prevent device tracking by non-authorized entities. This ID shall be long enough to allow proper security algorithms.

In many embodiments, the advertisement logic circuitry may generate a second, non-GATT advertisement associated with the first GATT advertisement. The second, non-GATT advertisement may include a random address ADDR2, an encoded personalized ID to identify a service provider, and a payload that contains ADDR1, which is the same ADDR1 included in the first (host generated) GATT advertisement. When the host application processor periodically rotates the ADDR1, the BT host controller may detect the change to ADDR1, generate a new second, non-GATT advertisement to synchronize ADDR1. The host application processor may also rotate, change, or otherwise randomly generate the personalized ID for the service provider as well as the ADDR2 for the second non-GATT advertisement.

A device looking for an advertisement for a service, herein referred to as a scanner device, may scan communications such as broadcast communications for advertisements. In many embodiments, the scanner device may seek an advertisement comprising a personalized ID that the scanner device can associate with the service provider for a service in which the scanner device is enrolled. For example, the scanner device may access a web site of an audio streaming service. The service provider of the audio streaming service may have internet access in a number of the businesses, airports, train stations, and/or the like that a user of the scanner device frequents.

The service provider may enter into agreements with access points such as the advertiser device to advertise services to BT devices within range. As part of the contract for advertising services, the service provider may provide the advertiser device with an algorithm such as a security algorithm to generate a unique personalized ID periodically such as an asymmetric key. The service provider may provide the advertiser device with, e.g., a public key of a private key/public key pair to generate the unique personalized ID periodically. In such embodiments, the service provider may provide or identify the algorithm such as a private key of the public key/private key pair to the scanner device so the scanner device has the capabilities to decode a personalized ID received via the second, non-GATT advertisement. The scanner device may decode the personalized ID with the algorithm provided by the service provider and associate the personalized ID with the service provider. In some embodiments, associating the personalized ID with the service provider may involve, e.g., comparing the personalized ID with the personalized ID received directly from the service provider when establishing (signing up for) the service. The scanner device may also determine that the ADDR1 of the payload of the second, non-GATT advertisement will match the ADDR1 of the service providers service when advertised in the first GATT advertisement by the advertiser device.

After determining the ADDR1, the scanner device may monitor for or actively seek the advertiser of the audio steaming service. For instance, the scanner device may passively wait to receive an advertisement from the advertiser that includes the ADDR1 and may use the GATT server service of the advertiser device to access the audio streaming from the service provider. In some embodiments, the scanner device may, alternatively, transmit a probe request to actively seek the advertiser device that offers the audio streaming for the service provider.

Embodiments may also comprise advertisement logic circuitry to facilitate communications by devices in accordance with Bluetooth specifications such as Bluetooth Core specifications 5.0, as well as older Bluetooth specifications such as 3.0, 4.0, and Bluetooth low energy (LE) specifications. Many embodiments also facilitate communications by devices in accordance with different versions of Institute of Electrical and Electronics Engineers (IEEE) 802.11 standards for wireless communications such as IEEE 802.11-2020, December 2020; IEEE P802.11be™/D1.0, May 2021; IEEE P802.11ax™/D8.0, IEEE P802.11ay™/D7.0, IEEE P802.11az™/D3.0, IEEE P802.11ba™/D8.0, IEEE P802.11bb™/D0.4, IEEE P802.11bc™/D1.02, and IEEE P802.11bd™/D1.1.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Various embodiments may be designed to address different technical problems associated with advertisement logic circuitry such extending a GATT advertisement service in a way compatible with legacy BT devices; generating a second advertisement that does not compromise the privacy of the service provider; determining when the host application processor rotates the address (ADDR1) of the first GATT advertisement; synchronizing the periodically rotating service provider address (ADDR1) with the ADDR1 included within the second non-GATT advertisement; changing the encoded personalized ID of the service provider periodically when the address of the service provider is changed in the first GATT advertisement; recognizing the address of the first GATT advertisement as being the address for the service provider; correlating the address in the first GATT advertisement with the address in the payload of the second non-GATT advertisement address; and/or the like.

Different technical problems such as those discussed above may be addressed by one or more different embodiments. Embodiments may address one or more of these problems associated with assessment. For instance, some embodiments that address problems associated with resource assessment may do so by one or more different technical means, such as, causing transmission of a first generic attribute profile (GATT) advertisement for a service provider, the first advertisement comprising a first address, to first address to be associated with the service provider; generating, via a Bluetooth host controller, a second non-GATT advertisement comprising a second address, an encoded personalized identifier (ID), and a payload, wherein the payload comprises the first address; causing transmission, via the Bluetooth host controller, of the second non-GATT advertisement; receiving, from a scanner device, a request for the service associated with the first address; receiving a first generic attribute profile (GATT) advertisement for a service provider, the first advertisement comprising a first address, to first address to be associated with the service provider; receiving a second non-GATT advertisement comprising a second address, an encoded personalized identifier (ID), and a payload, wherein the payload comprises the first address; decoding the encoded personalized ID; comparing the decoded personalized ID with a personalized ID received from the service provider; and requesting, from an advertisement device that transmitted the first GATT advertisement, the service associated with the first address; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Some embodiments may facilitate wireless communications in accordance with multiple standards like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

FIG. 1A depicts a system diagram illustrating an embodiment of a network environment for advertisement logic circuitry, in accordance with one or more example embodiments. Wireless network 1000 may include one or more user devices 1020 and one or more access points(s) (AP) 1005, which may communicate in accordance with Bluetooth communication standards and/or 802.11 communication standards. The user device(s) 1020 may comprise mobile devices that are non-stationary (e.g., not having fixed locations) and/or stationary devices.

In some embodiments, the user device(s) 1020 and the AP(s) 1005 may include one or more computer systems similar to that of the functional diagram of FIG. 3 and/or the example machine/system of FIGS. 5, 6, 7, and 8.

One or more illustrative user device(s) 1020 and/or AP(s) 1005 may be operable by one or more user(s) 1010. It should be noted that any addressable unit may be a station (STA). A STA may take on multiple distinct characteristics, each of which shape its function. For example, a single addressable unit might simultaneously be a Bluetooth low energy (BLE) STA, portable STA, a quality-of-service (QoS) STA, a dependent STA, and a hidden STA. The one or more illustrative user device(s) 1020 and the AP(s) 1005 may be STAs. The one or more illustrative user device(s) 1020 and/or AP(s) 1005 may operate as an extended service set (ESS), a basic service set (BSS), a personal basic service set (PBSS), or a control point/access point (PCP/AP). The user device(s) 1020 (e.g., 1024, 1025, 1026, 1027, 1028, or 1029) and/or AP(s) 1005 may include any suitable processor-driven device including, but not limited to, a mobile device or a non-mobile, e.g., a static device. For example, user device(s) 1020 and/or AP(s) 1005 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless network interface, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

In some embodiments, the user device(s) 1020 and/or AP(s) 1005 may also include mesh stations in, for example, a mesh network, in accordance with one or more IEEE 802.11 standards and/or 3GPP standards.

Any of the user device(s) 1020 (e.g., user devices 1024, 1025, 1026, 1027, 1028, and 1029) and AP(s) 1005 may be configured to communicate with each other via one or more communications networks 1030 and/or 1035 wirelessly or wired. In some embodiments, the user device(s) 1020 may also communicate peer-to-peer or directly with each other, e.g., via Bluetooth, without the AP(s) 1005.

The user devices 1020 may include, e.g., a scanner device that is a mobile phone 1024 operating on a Bluetooth (BT) channel and one or more advertiser devices that operate on BT channels as well as Wi-Fi channels. The scanner devices may also include a computer 1025, a laptop 1028, and a tablet 1029. The mobile phone 1024 scan for advertisements to locate an advertisement for a service provider for, e.g., streaming audio services.

In the present embodiment, the BLE AP 1027 may comprise an advertiser device. The advertiser device 1027 may advertise BLE services such as the audio streaming service of the service provider. In several embodiments, the BLE AP 1027 may subscribe with the service provider as an advertiser device with the web site of the service provider via the Internet.

The BLE AP 1027 may transmit advertisements compatible with pre-BLE 5.0 (legacy) devices as well as newer devices. In many embodiments, the BLE AP 1027 may transmit a first advertisement and a second advertisement associated with the service provider. For instance, the BLE AP 1027 may transmit the first advertisement via a GATT server service and may transmit a second advertisement that is not via a GATT server service. The first advertisement may be referred to as a first GATT advertisement and may include a first address (ADDR1) that is randomly generated, scrambled, rotated, and/or the like, periodically to prevent unauthorized entities from tracking packets associated with the service provider.

The second advertisement may be referred to as a second non-GATT advertisement and may include a second address (ADDR2) that is randomly generated, scrambled, rotated, and/or the like, periodically, to prevent unauthorized entities from tracking packets associated with the service provider. The second advertisement may also include an encoded personalized ID (or personalized discovery ID) and a payload including the first address (ADDR1) from the first advertisement. The first address may associate the second advertisement with the first advertisement and the encoded personalized ID may associate the second advertisement with the service provider.

The scanner device, mobile phone 1024, may scan for the second advertisement, decode the personalized ID to associate the second advertisement with the service provider, and parse the second advertisement for the first address (ADDR1) in the payload. Once the mobile phone 1024 determines the first address (ADDR1), the mobile phone may scan for the first advertisement. Upon receipt of the first advertisement, which is identified by the first address, the mobile phone 1024 may utilize the GATT server service via the first advertisement and the first address (ADDR1) to connect with the audio streaming service of the service provider. In other embodiments, the mobile phone 1024 may, based on the first address (ADDR1) from the second advertisement, actively seek the BLE AP 1027 to connect with the services of the service provider associated with the first address (ADDR1).

In several embodiments, after the BLE AP 1027 rotates, scrambles, or otherwise changes the value of the first address (ADDR1), the BLE AP 1027 may also rotate, scramble, or otherwise change the value of the second address (ADDR2) and the encoded personalized ID. The second advertisement may carry the new value for the first address (ADDR1) in the payload after the BLE AP 1027 rotates, scrambles, or otherwise changes the value of the first address (ADDR1).

Any of the communications networks 1030 and/or 1035 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 1030 and/or 1035 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 1030 and/or 1035 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 1020 (e.g., user devices 1024, 1025, 1026, 1027, 1028, and 1029) and AP(s) 1005 may include one or more communications antennas. The one or more communications antennas may be any suitable type of antennas corresponding to the communications protocols used by the user device(s) 1020 (e.g., user devices 1024, 1025, 1026, 1027, 1028, and 1029) and AP(s) 1005. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 1020 and/or AP(s) 1005.

Any of the user device(s) 1020 (e.g., user devices 1024, 1025, 1026, 1027, 1028, and 1029) and AP(s) 1005 may be configured to wirelessly communicate in a wireless network. Any of the user device(s) 1020 (e.g., user devices 1024, 1025, 1026, 1027, 1028, and 1029) and AP(s) 1005 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 1020 (e.g., user devices 1024, 1025, 1026, 1027, 1028, and 1029) and AP(s) 1005 may be configured to perform any given directional transmission towards one or more defined transmit sectors. Any of the user device(s) 1020 (e.g., user devices 1024, 1025, 1026, 1027, 1028, and 1029) and AP(s) 1005 may be configured to perform any given directional reception from one or more defined receive sectors.

MIMO beamforming in a wireless network may be accomplished using RF beamforming and/or digital beamforming. In some embodiments, in performing a given MIMO transmission, user devices 1020 and/or AP(s) 1005 may be configured to use all or a subset of its one or more communications antennas to perform MIMO beamforming.

Any of the user devices 1020 (e.g., user devices 1024, 1025, 1026, 1027, 1028, and 1029) and AP(s) 1005 may include any suitable radio and/or transceiver for transmitting and/or receiving radio frequency (RF) signals in the bandwidth and/or channels corresponding to the communications protocols utilized by any of the user device(s) 1020 and AP(s) 1005 to communicate with each other. The radio components may include hardware and/or software to modulate and/or demodulate communications signals according to pre-established transmission protocols. The radio components may further have hardware and/or software instructions to communicate via Bluetooth protocols such as Bluetooth 5.0 or may communicate via one or more Wi-Fi and/or Wi-Fi direct protocols, as standardized by the Institute of Electrical and Electronics Engineers (IEEE) 802.11 standards. The radio component may include any known receiver and baseband suitable for communicating via the communications protocols. The radio component may further include a power amplifier (PA), a low noise amplifier (LNA), additional signal amplifiers, an analog-to-digital (A/D) converter, one or more buffers, and a digital baseband.

Figure 1B:
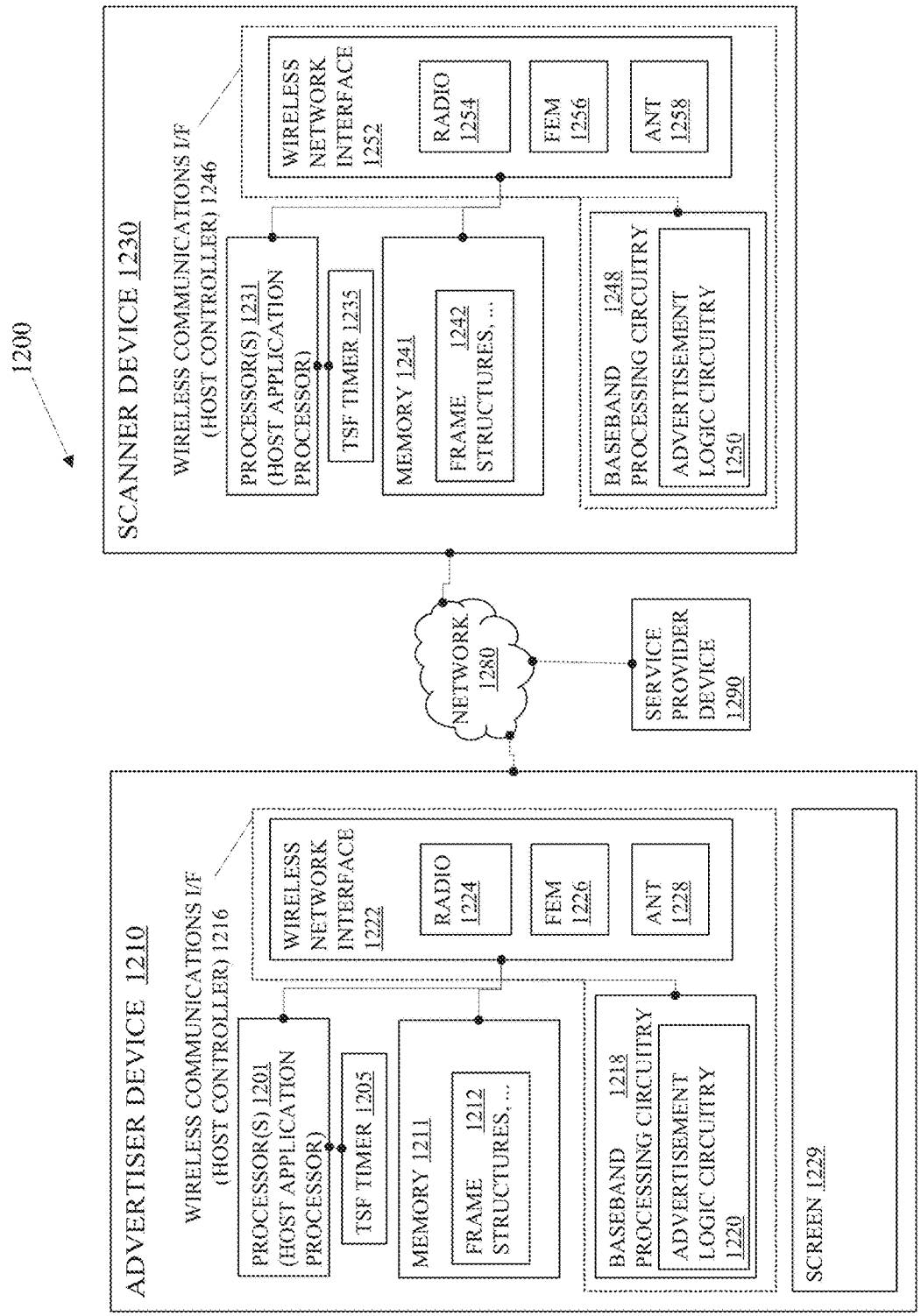
FIG. 1B depicts an embodiment of a system including multiple devices to implement advertisement logic circuitry, in accordance with one or more example embodiments.

FIG. 1B depicts an embodiment of a system 1200 including multiple BT devices to implement advertisement logic circuitry, in accordance with one or more example embodiments. System 1200 may transmit or receive as well as generate, decode, and interpret transmissions between an advertiser device 1210, a scanner device 1230, and a service provider device 1290. The advertiser device 1210 may wirelessly connect to the scanner device 1230 via a Bluetooth channel such as a 2.4 GHz channel.

In some embodiments, the advertiser device 1210, scanner device 1230, and the service provider device 1290 may include one or more computer systems similar to that of the example machines/systems of FIGS. 5, 6, 7, and 8.

The scanner device 1230 may include advertisement logic circuitry, such as the advertisement logic circuitry 1220 of advertiser device 1210, to associate with the advertiser device 1210 via TxOPs on a Bluetooth low energy (BLE) channel (e.g., 2.4 GHz).

The advertiser device 1210 may transmit advertisements for the service provider device 1290. The advertisements may include a first advertisement and a second advertisement. The first advertisement may be a ADV Set-1—GATT server advertisement. This advertisement may be provided via Bluetooth LE advertisement publishing services provided by the advertising device 1210. In many embodiments, the MAC address (ADDR1) of the first advertisement is rotated periodically as defined by Bluetooth standard.

The second advertisement may be a ADV Set-2. The second advertisement may be an additional non-GATT advertisement that publishes a personalized discovery ID (or personalized ID). In many embodiments, the personalized ID may be also rotated periodically and its rotation, as well as rotation of MAC address (ADDR2) of the second advertisement packet may be synchronized with rotation of MAC Address (ADDR1) of the GATT server advertisement. The MAC address of the non-GATT advertising (host offloaded) is different than the MAC address of the GATT server advertising since both address are randomized periodically, via same period trigger.

The scanner device 1230 may be a non BLE 5.0 device and may scan the two sets as two different MAC addresses (as if they are different devices). An additional mechanism that allows to scanner device 1230 (device that looks for specific advertising device) to correlate between the first and second advertisement packets is MAC address of GATT advertisement packet that is added as payload to non-GATT advertisement packet.

The scanner device 1230 may first scan for a non-GATT advertisement packet only. When receiving the second advertisement, the scanner device 1230 verifies that personalized ID belongs to the specific device it is seeking, e.g., the service provider device 1290. If the personalized ID is associated with the service provider device 1290, the scanner device may then seek the first GATT advertisement and establish connection with a GATT server of the advertiser device 1210 in order to utilize GATT service. If the personalized ID is not associated with the service provider device 1290, the scanner device may continue to scan for a second non-GATT advertisement that includes the personalized ID that is associated with the service provider 1290.

In many embodiments, the personalized ID included in the second advertisement comprises an encoded personalized ID. The advertisement logic circuitry 1250 of the scanner 1230 may decode the encoded personalized ID via an algorithm identified by or obtained from the service provider device 1290 when the scanner device 1230 subscribed to services of the service provider device 1290. In some embodiments, the scanner device 1230 may also receive the personalized ID from the service provider 1290 to compare with the decoded personalized ID from the second advertisement to verify that the second advertisement is associated with the service provider 1290.

The advertiser device 1210 may comprise a wireless communications interface 1216 (also referred to as a BT host controller) comprising baseband processing circuitry 1218 coupled with a wireless network interface 1222 to perform MAC layer (link layer) and physical layer (PHY) functionality for transmitting and receiving communications via, e.g., a BLE channel. In some embodiments, the baseband processing circuitry 1218 may interact with one or more analog devices to perform PHY functionality such as scrambling, encoding, modulating, and the like. In other embodiments, the baseband processing circuitry 1218 may execute code to perform one or more of the PHY functionality such as scrambling, encoding, modulating, and the like.

The MAC layer functionality may execute MAC layer code stored in the memory 1211. In further embodiments, the MAC layer functionality may interface the processor(s) 1201.

The MAC layer functionality may communicate with the PHY to transmit a MAC frame such as a BT frame, in a PHY frame to the scanner device 1230. The MAC layer functionality may generate frames such as management, data, and control frames.

The PHY may prepare the MAC frame for transmission by, e.g., determining a preamble to prepend to a MAC frame to create a PHY frame. A wireless network interface 1222 or the baseband processing circuitry 1218 may prepare the PHY frame as a scrambled, encoded, modulated PDU in the time domain signals for the radio 1224. Furthermore, the TSF timer 1205 may provide a timestamp value to indicate the time at which the PDU is transmitted.

After processing the PHY frame, a radio 1224 may impress digital data onto subcarriers of RF frequencies for transmission. A front end module (FEM) 1226 with one or more filters and one or more stages of amplifiers including at least one power amplifier (PA) may prepare the subcarriers of RF frequencies for transmission by electromagnetic radiation via elements of an antenna array or antennas 1224 and via the network 1280 to a receiving device such as the scanner device 1230.

The wireless network I/F 1222 also comprises a receiver. The receiver receives electromagnetic energy, extracts the digital data, and the analog PHY and/or the baseband processor 1218 decodes a PHY frame and a MAC frame from a PDU.

The scanner device 1230 may receive the BT frame from the advertiser device 1210 via the network 1280. The scanner device 1230 may comprise processor(s) 1231 and memory 1241. The processor(s) 1231 may comprise any data processing device such as a microprocessor, a microcontroller, a state machine, and/or the like, and may execute instructions or code in the memory 1241. The memory 1241 may comprise a storage medium such as Dynamic Random Access Memory (DRAM), read only memory (ROM), buffers, registers, cache, flash memory, hard disk drives, solid-state drives, or the like. The memory 1241 may store 1242 the frames, frame structures, frame headers, etc., and may also comprise code to generate, scramble, encode, decode, parse, and interpret MAC frames and/or PHY frames (PDUs).

The scanner device 1230 may comprise a wireless communications interface 1246 (also referred to as a BT host controller) comprising baseband processing circuitry 1248 coupled with a wireless network interface 1252 to perform MAC layer (link layer) and physical layer (PHY) functionality for transmitting and receiving communications via, e.g., a BLE channel. The baseband processing circuitry 1248 may comprise a baseband processor and/or one or more circuits to implement a station management entity and the station management entity may interact with a MAC layer management entity to perform MAC layer functionality and a PHY management entity to perform PHY functionality. In such embodiments, the baseband processing circuitry 1248 may interact with processor(s) 1231 to coordinate higher level functionality, such as an application level functionality, with MAC layer and PHY functionality.

In some embodiments, the baseband processing circuitry 1248 may interact with one or more analog devices to perform PHY functionality such as descrambling, decoding, demodulating, and the like. In other embodiments, the baseband processing circuitry 1248 may execute code to perform one or more of the PHY functionalities such as descrambling, decoding, demodulating, and the like.

The scanner device 1230 may receive the BT frame at the antennas 1258, which pass the signals along to the FEM 1256. The FEM 1256 may amplify and filter the signals via one or more stages of filters and one or more stages of amplifiers including at least one low noise amplifier (LNA) and pass the signals to the radio 1254. The radio 1254 may filter the carrier signals from the signals and determine if the signals represent a PDU. If so, analog circuitry of the wireless network I/F 1252 or physical layer functionality implemented in the baseband processing circuitry 1248 may demodulate, decode, descramble, etc. the PDU. The baseband processing circuitry 1248 may identify, parse, and interpret the BT frame from PDU.

Figure 1C:
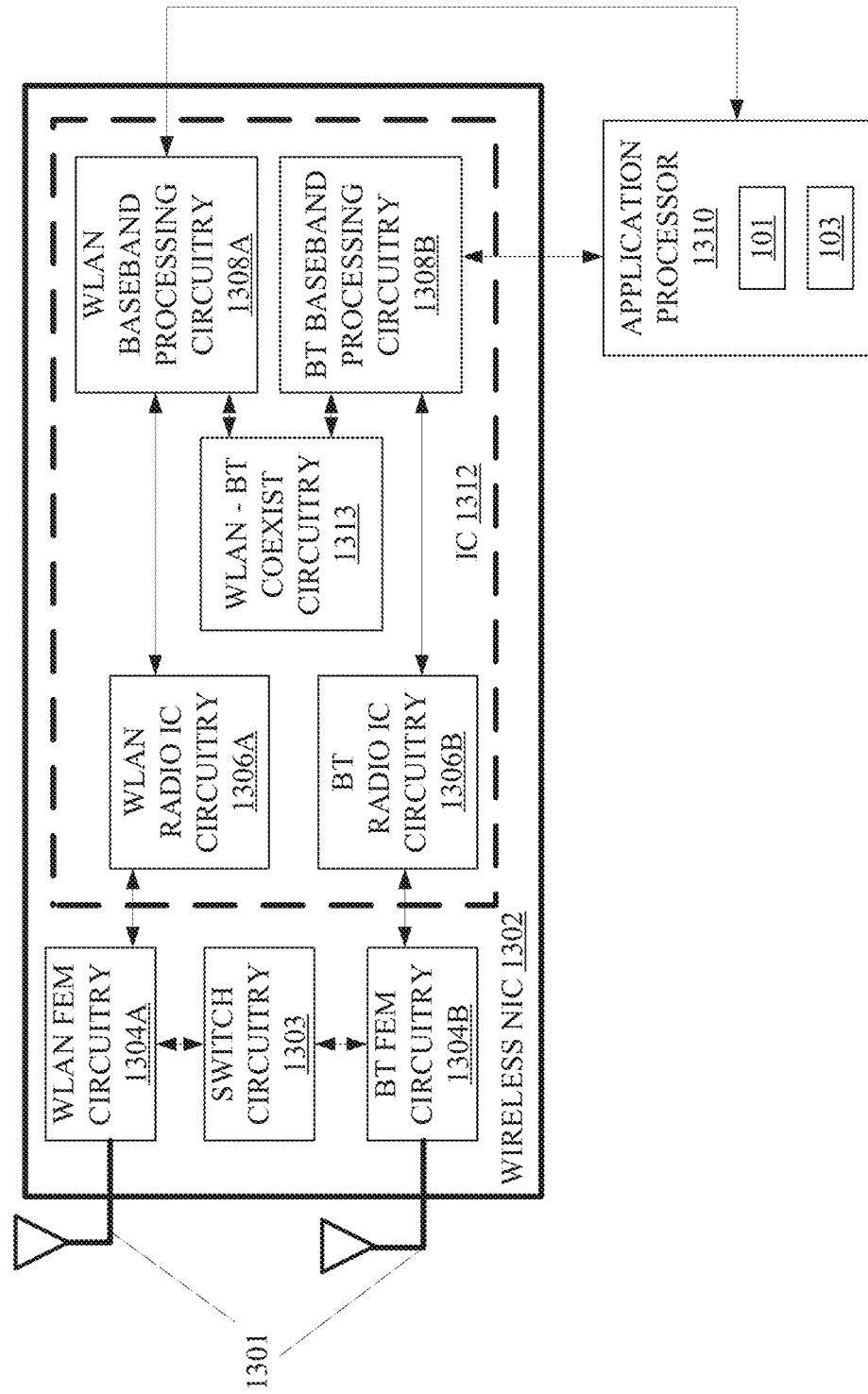
FIG. 1C illustrates an embodiment of a radio architecture for STAs, such as the wireless interfaces for STAs depicted in FIGS. 1A-B, to implement advertisement logic circuitry.

FIG. 1C is a block diagram of a radio architecture 1300 such as the wireless communications I/F 1222 and 1252 in accordance with some embodiments that may be implemented in, e.g., the advertiser device 1210 and/or the scanner device 1230 of FIG. 1C. The radio architecture 1300 may include radio front-end module (FEM) circuitry 1304*a-b*, radio IC circuitry 1306*a-b* and baseband processing circuitry 1308*a-b*. The radio architecture 1300 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304*a-b* may include a WLAN or Wi-Fi FEM circuitry 1304*a* and a Bluetooth (BT) FEM circuitry 1304*b*. The WLAN FEM circuitry 1304*a* may include a receive signal path comprising circuitry configured to operate on WLAN RF signals received from one or more antennas 1301, to amplify the received signals and to provide the amplified versions of the received signals to the WLAN radio IC circuitry 1306*a* for further processing. The BT FEM circuitry 1304*b* may include a receive signal path which may include circuitry configured to operate on BT RF signals received from one or more antennas 1301, to amplify the received signals and to provide the amplified versions of the received signals to the BT radio IC circuitry 1306*b* for further processing. FEM circuitry 1304*a* may also include a transmit signal path which may include circuitry configured to amplify WLAN signals provided by the radio IC circuitry 1306*a* for wireless transmission by one or more of the antennas 1301. In addition, FEM circuitry 1304*b* may also include a transmit signal path which may include circuitry configured to amplify BT signals provided by the radio IC circuitry 1306*b* for wireless transmission by the one or more antennas. In the embodiment of FIG. 1C, although FEM 1304*a* and FEM 1304*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306*a-b* as shown may include WLAN radio IC circuitry 1306*a* and BT radio IC circuitry 1306*b*. The WLAN radio IC circuitry 1306*a* may include a receive signal path which may include circuitry to down-convert WLAN RF signals received from the FEM circuitry 1304*a* and provide baseband signals to WLAN baseband processing circuitry 1308*a*. BT radio IC circuitry 1306*b* may in turn include a receive signal path which may include circuitry to down-convert BT RF signals received from the FEM circuitry 1304*b* and provide baseband signals to BT baseband processing circuitry 1308*b*. WLAN radio IC circuitry 1306*a* may also include a transmit signal path which may include circuitry to up-convert WLAN baseband signals provided by the WLAN baseband processing circuitry 1308*a* and provide WLAN RF output signals to the FEM circuitry 1304*a* for subsequent wireless transmission by the one or more antennas 1301. BT radio IC circuitry 1306*b* may also include a transmit signal path which may include circuitry to up-convert BT baseband signals provided by the BT baseband processing circuitry 1308*b* and provide BT RF output signals to the FEM circuitry 1304*b* for subsequent wireless transmission by the one or more antennas 1301. In the embodiment of FIG. 1C, although radio IC circuitries 1306*a* and 1306*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1308*a-b* may include a WLAN baseband processing circuitry 1308*a* and a BT baseband processing circuitry 1308*b*. The WLAN baseband processing circuitry 1308*a* may include a memory, such as, for example, a set of RAM arrays in a Fast Fourier Transform or Inverse Fast Fourier Transform block (not shown) of the WLAN baseband processing circuitry 1308*a*. Each of the WLAN baseband circuitry 1308*a* and the BT baseband circuitry 1308*b* may further include one or more processors and control logic to process the signals received from the corresponding WLAN or BT receive signal path of the radio IC circuitry 1306*a-b*, and to also generate corresponding WLAN or BT baseband signals for the transmit signal path of the radio IC circuitry 1306*a-b*. Each of the baseband processing circuitries 1308*a* and 1308*b* may further include physical layer (PHY) and medium access control layer (MAC) circuitry (or link layer circuitry), and may further interface with a device for generation and processing of the baseband signals and for controlling operations of the radio IC circuitry 1306*a-b*.

Referring still to FIG. 1C, according to the shown embodiment, WLAN-BT coexistence circuitry 1313 may include logic providing an interface between the WLAN baseband circuitry 1308*a* and the BT baseband circuitry 1308*b* to enable use cases requiring WLAN and BT coexistence. In addition, a switch circuitry 1303 may be provided between the WLAN FEM circuitry 1304*a* and the BT FEM circuitry 1304*b* to allow switching between the WLAN and BT radios according to application needs. In addition, although the antennas 1301 are depicted as being respectively connected to the WLAN FEM circuitry 1304*a* and the BT FEM circuitry 1304*b*, embodiments include within their scope the sharing of one or more antennas as between the WLAN and BT FEMs, or the provision of more than one antenna connected to each of FEM 1304*a* or 1304*b*.

In some embodiments, the front-end module circuitry 1304*a-b*, the radio IC circuitry 1306*a-b*, and baseband processing circuitry 1308*a-b* may be provided on a single radio card, such as wireless network interface card (NIC) 1302. In some other embodiments, the one or more antennas

1301, the FEM circuitry 1304*a-b* and the radio IC circuitry 1306*a-b* may be provided on a single radio card. In some other embodiments, the radio IC circuitry 1306*a-b* and the baseband processing circuitry 1308*a-b* may be provided on a single chip or integrated circuit (IC), such as IC 1312.

In some embodiments, the wireless NIC 1302 may include a WLAN radio card and may be configured for Wi-Fi communications, although the scope of the embodiments is not limited in this respect. In some of these embodiments, the radio architecture 1300 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1300 may be part of a Wi-Fi communication station (STA) such as a wireless access point (AP), a base station or a mobile device including a Wi-Fi device. In some of these embodiments, radio architecture 1300 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2020, 802.11ay, 802.11ba, 802.11ax, and/or 802.11be standards and/or proposed specifications for WLANs, although the scope of embodiments is not limited in this respect. The radio architecture 1300 may also be suitable to transmit and/or receive communications in accordance with other techniques and standards.

In some embodiments, the radio architecture 1300 may be configured for high-efficiency Wi-Fi (HEW) communications in accordance with the IEEE 802.11ax standard. In these embodiments, the radio architecture 1300 may be configured to communicate in accordance with an OFDMA technique, although the scope of the embodiments is not limited in this respect.

In some other embodiments, the radio architecture 1300 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

Figure 1D:
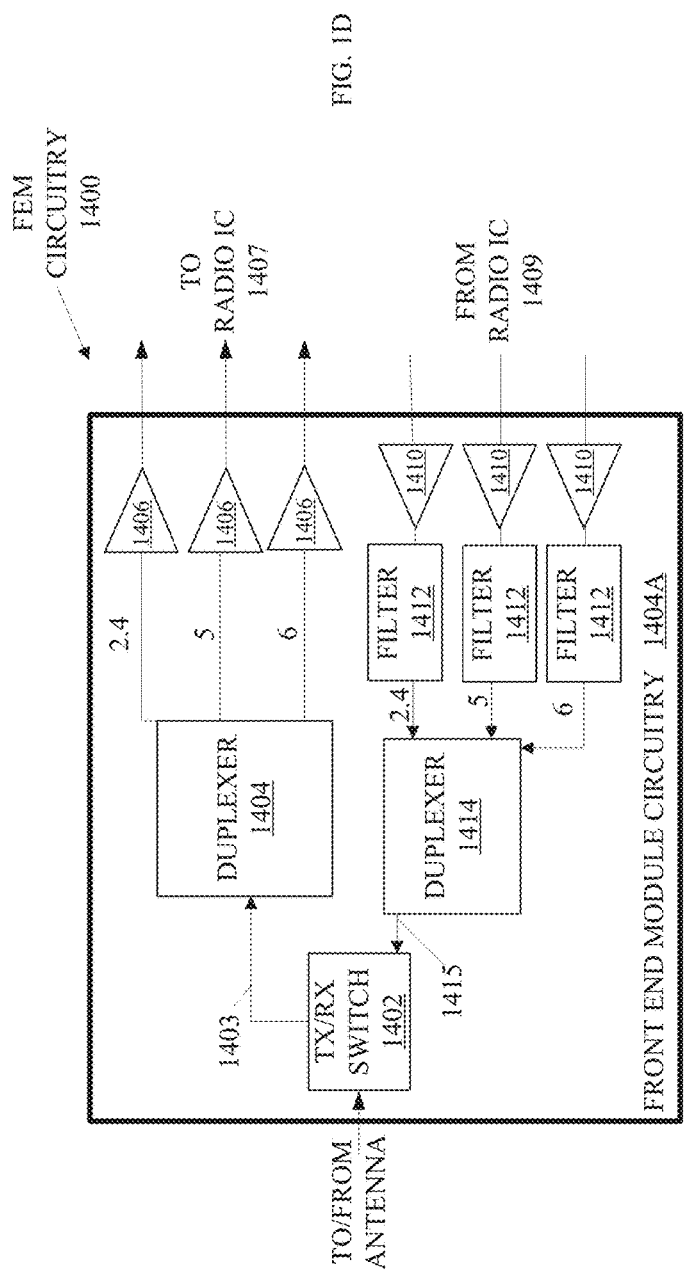
FIG. 1D illustrates an embodiment of front end module (FEM) circuitry of a wireless interface for STAs, such as the STAs in FIGS. 1A-B, to implement advertisement logic circuitry.

In some embodiments, as further shown in FIG. 1D, the BT baseband circuitry 1308*b* may be compliant with a Bluetooth (BT) connectivity specification such as Bluetooth 5.0, or any other iteration of the Bluetooth specification.

In some embodiments, the radio architecture 1300 may include other radio cards, such as a cellular radio card configured for cellular (e.g., 5GPP such as LTE, LTE-Advanced or 7G communications).

In some IEEE 802.11 embodiments, the radio architecture 1300 may be configured for communication over various channel bandwidths including bandwidths having center frequencies of about 2.4 GHz, 5 GHz, and 6 GHz. The various bandwidths may include bandwidths of about 20 MHz, 40 MHz, 80 MHz, 160 MHz, 240 MHz, and 320 MHz with contiguous or non-contiguous bandwidths having increments of 20 MHz, 40 MHz, 80 MHz, 160 MHz, 240 MHz, and 320 MHz. The scope of the embodiments is not limited with respect to the above center frequencies, however.

FIG. 1D illustrates front end module (FEM) circuitry 1400 such as WLAN FEM circuitry 1304*a* and/or the BT FEM circuitry 1304*b* shown in FIG. 1C in accordance with some embodiments. Although the example of FIG. 1E is described in conjunction with the WLAN FEM circuitry 1304*a*, the example of FIG. 1E may be described in conjunction with other configurations such as the BT FEM circuitry 1304*b*.

In some embodiments, the FEM circuitry 1400 may include a TX/RX switch 1402 to switch between transmit mode and receive mode operation. The FEM circuitry 1400 may include a receive signal path and a transmit signal path. The receive signal path of the FEM circuitry 1400 may include a low-noise amplifier (LNA) 1406 to amplify received RF signals 1403 and provide the amplified received RF signals 1407 as an output (e.g., to the radio IC circuitry 1306*a-b* (FIG. 1D)). The transmit signal path of the circuitry 1304*a* may include a power amplifier (PA) to amplify input RF signals 1409 (e.g., provided by the radio IC circuitry 1306*a-b*), and one or more filters 1412, such as band-pass filters (BPFs), low-pass filters (LPFs) or other types of filters, to generate RF signals 1415 for subsequent transmission (e.g., by one or more of the antennas 1301 (FIG. 1D)) via an example duplexer 1414.

In some dual-mode embodiments for Wi-Fi communication, the FEM circuitry 1400 may be configured to operate in the 2.4 GHz frequency spectrum, the 5 GHz frequency spectrum, or the 6 GHz frequency spectrum. In these embodiments, the receive signal path of the FEM circuitry 1400 may include a receive signal path duplexer 1404 to separate the signals from each spectrum as well as provide a separate LNA 1406 for each spectrum as shown. In these embodiments, the transmit signal path of the FEM circuitry 1400 may also include a power amplifier 1410 and a filter 1412, such as a BPF, an LPF or another type of filter for each frequency spectrum and a transmit signal path duplexer 1404 to provide the signals of one of the different spectrums onto a single transmit path for subsequent transmission by the one or more of the antennas 1301 (FIG. 1D). In some embodiments, BT communications may utilize the 2.4 GHz signal paths and may utilize the same FEM circuitry 1400 as the one used for WLAN communications.

Figure 1E:
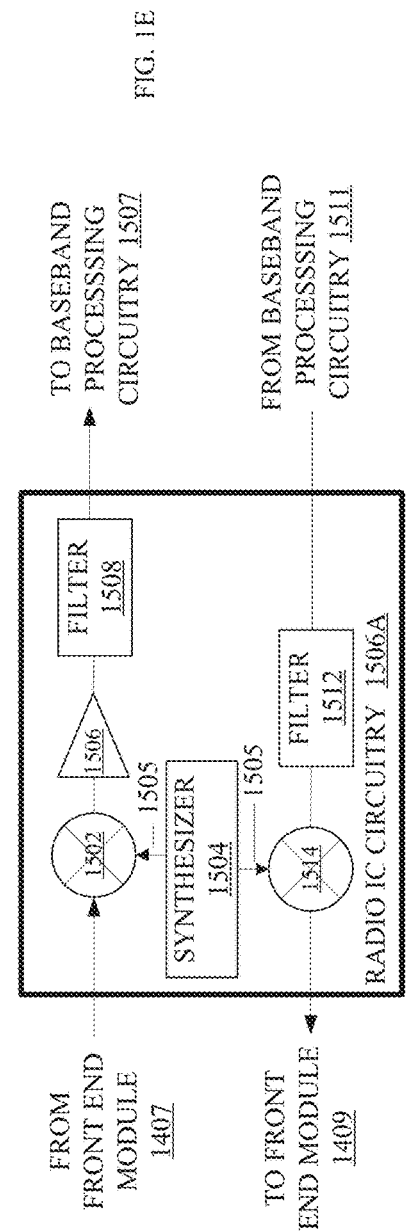
FIG. 1E illustrates an embodiment of radio integrated circuit (IC) circuitry of a wireless interface for STAs, such as the STAs in FIGS. 1A-B, to implement advertisement logic circuitry.

FIG. 1E illustrates radio integrated circuit (IC) circuitry 1506*a* in accordance with some embodiments. The radio IC circuitry 1306*a* is one example of circuitry that may be suitable for use as the WLAN or BT radio IC circuitry 1306*a*/1306*b* (FIG. 1D), although other circuitry configurations may also be suitable. Alternatively, the example of FIG. 1F may be described in conjunction with the example BT radio IC circuitry 1306*b*.

In some embodiments, the radio IC circuitry 1306*a* may include a receive signal path and a transmit signal path. The receive signal path of the radio IC circuitry 1306*a* may include at least mixer circuitry 1502, such as, for example, down-conversion mixer circuitry, amplifier circuitry 1506 and filter circuitry 1508. The transmit signal path of the radio IC circuitry 1306*a* may include at least filter circuitry 1512 and mixer circuitry 1514, such as, for example, upconversion mixer circuitry. Radio IC circuitry 1306*a* may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 1F illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304*a-b* (FIG. 1D) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308*a-b* (FIG. 1D) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304*a-b*. The baseband signals 1511 may be provided by the baseband processing circuitry 1308*a-b* and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or upconversion respectively with the help of synthesizer 1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct upconversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 1F may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 1F). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 1E) may comprise a balanced signal, although the scope of the embodiments is not limited in this respect. The I and Q baseband output signals may be provided to low-noise amplifier, such as amplifier circuitry 1506 (FIG. 1F) or to filter circuitry 1508 (FIG. 1F).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1504 may be provided by a voltage controlled oscillator (VCO), although that is not a requirement. A divider control input may further be provided by either of the baseband processing circuitry 1308*a-b* (FIG. 1D) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example secure signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

FIG. 1F illustrates a functional block diagram of baseband processing circuitry 1308*a* in accordance with some embodiments. The baseband processing circuitry 1308*a* is one example of circuitry that may be suitable for use as the baseband processing circuitry 1308*a* (FIG. 1D), although other circuitry configurations may also be suitable. Alternatively, the example of FIG. 1F may be used to implement the example BT baseband processing circuitry 1308b of FIG. 1D.

The baseband processing circuitry 1308a may include a receive baseband processor (RX BBP) 1602 for processing receive baseband signals 1509 provided by the radio integrated circuit (IC) circuitry 1306a-b (FIG. 1D) and a transmit baseband processor (TX BBP) 1604 for generating transmit baseband signals 1511 for the radio IC circuitry 1306a-b. The baseband processing circuitry 1308a may also include control logic 1606 for coordinating the operations of the baseband processing circuitry 1308a.

In some embodiments (e.g., when analog baseband signals are exchanged between the baseband processing circuitry 1308a-b and the radio IC circuitry 1306a-b), the baseband processing circuitry 1308a may include ADC 1610 to convert analog baseband signals 1609 received from the radio IC circuitry 1306a-b to digital baseband signals for processing by the RX BBP 1602. In these embodiments, the baseband processing circuitry 1308a may also include digital-to-analog converter (DAC) 1612 to convert digital baseband signals from the TX BBP 1604 to analog baseband signals 1611.

In some embodiments that communicate orthogonal frequency multiplexing (OFDM) signals or orthogonal frequency multiple access (OFDMA) signals, such as through baseband processor 1308a, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1D, in some embodiments, the antennas 1301 (FIG. 1D) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 1300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

FIG. 2 depicts another embodiment of an interaction diagram 2000 to implement advertisement logic circuitry such as the advertisement logic circuitry described in conjunction with FIGS. 1-8. The interaction diagram 2000 illustrates interactions of an advertiser device 2020, a scanner device 2030, and a service provider device 2040. The interaction diagram 2000 may not show every detailed step performed but may show the steps generally.

The advertisement logic circuitry of the scanner device (such as the scanner device 1230 shown in FIG. 1B) may sign-up for and establish a service 2050 with the service provider device 2040 such as an audio streaming service. After signing-up for the service, the service provider device 2040 may communicate an algorithm 2052 to the scanner device 2030 to allow the scanner device 2030 to identify advertisements for the services of the service provider device 2040. For instance, the algorithm may comprise a well-known algorithm that the scanner device 2030 may implement, or the service provider device 2040 may transmit an algorithm to the scanner device 2030. In some embodiments, the service provider 2040 may also transmit a personalized ID to the scanner device 2030 for detection of advertisements for the services of the service provider device 2040.

The advertiser device 2020 may sign-up with the service provider device 2040 to advertise services 2054 for the service provider. After signing-up to advertise the services, the service provider device 2040 may communicate an algorithm 2056 to the advertiser device 2040 to allow the advertiser device 2040 to encode a personalized ID for the service provider device 2040 to identify the services of the service provider device 2040. In some embodiments, the personalized ID is generated by the algorithm and, in other embodiments, the service provider device 2040 may transmit the personalized ID to the advertiser device 2020. Furthermore, the algorithm may comprise a well-known algorithm that the advertiser device 2020 may implement, or the service provider device 2040 may transmit an algorithm to the advertiser device 2020.

The advertisement logic circuitry of the advertiser device 2020 (such as the advertiser device 1210 shown in FIG. 1B) may communicate a first advertisement such as a first GATT advertisement 2057. In some embodiments, the scanner device 2030 may ignore the first advertisement and seek a second non-GATT advertisement because the scanner device 2030 may not have a capability of determining if the first advertisement is related to the service provider device 2040 until after the scanner device 2030 receives and interprets the second advertisement.

The advertisement logic circuitry of the advertiser device 2020 (such as the advertiser device 1210 shown in FIG. 1B) may communicate a second advertisement such as the second non-GATT advertisement 2058. The second advertisement may include a second address (ADDR2), an encoded personalized ID, and a payload that includes the first address (ADDR1). The second address (ADDR2) may be randomly or otherwise generated to prevent tracking from unauthorized entities, the encoded personalized ID may comprise the personalized ID with the algorithm identified/provided by the service provider 2040, and the first address (ADDR1) may be the address that currently transmits in a first advertisement. For instance, the advertiser device 2020 may broadcast the second advertisement to all BT devices, broadcast the second advertisement to a group of BT devices, or transmit the second advertisement to the scanner device 2030.

After communication of the second advertisement 2058, the advertiser device 2020 may communicate the first advertisement again such as a first GATT advertisement with the first address (ADDR1). The first address may be randomly generated or otherwise generated to prevent tracking from unauthorized entities.

After the scanner device 2030 receives the second advertisement and the first advertisement, the scanner device 2030 may access the service via a GATT service of the advertiser device 2020.

FIG. 3 depicts an embodiment of a flowchart 3000 to implement advertisement logic circuitry such as the advertisement logic circuitry discussed in FIGS. 1-3. The advertisement logic circuitry of the advertiser device may establish an advertising service for a service provider. As part of the advertising, the advertiser device may agree to keep a personalized ID private with a security algorithm provided by or identified by the service provider. For instance, the service provider may identify a well-known security algorithm and indicate the advertiser device may use that well known security algorithm to maintain security of the personalized ID. In such embodiments, the service provider may also identify the well-known security algorithm to the scanner device and indicate the scanner device should use that well known security algorithm to decode the personalized ID.

At element 3010, advertisement logic circuitry of the advertiser device (e.g., the advertisement logic circuitry 1220 of the advertiser device 1210 shown FIG. 1B) may cause transmission of a first generic attribute profile (GATT) advertisement for a service provider. The first GATT advertisement may comprise a first address and the first address may be associated with the service provider.

At element 3015, the advertiser device may generate, via a Bluetooth host controller, a second non-GATT advertisement comprising a second address, an encoded personalized identifier (ID), and a payload. The payload may also comprise the first address, which is the same first address that is included in the first GATT advertisement. Note that the advertiser logic circuitry may generate the second address and generation of the second address may comprise generation of a random number.

At element 3020, the advertiser device may cause transmission, via the Bluetooth host controller, of the second non-GATT advertisement. The advertiser device may periodically transmit the first GATT advertisement and may periodically transmit the second non-GATT advertisement. While these advertisements may be transmitted at the same periodicity, the periodicities of the transmissions of the first GATT advertisement and the second non-GATT advertisement are not necessary the same.

After transmitting the first GATT advertisement and the second non-GATT advertisement, at element 3025, the advertiser device may receive, from a scanner device, a request for the service associated with the first address. Note that the advertiser may also periodically change the value of the first address to prevent tracking by unauthorized entities. In many embodiments, the advertisement logic circuitry of the advertiser device may detect the change in the first address and may generate a new value for the encoded personalized ID in accordance with an algorithm provided by the service provider. In many embodiments, the advertisement logic circuitry of the advertiser device may detect the change in the first address and may generate a new value for the second address in response to detection of the change in the value of the first address.

Figure 4:
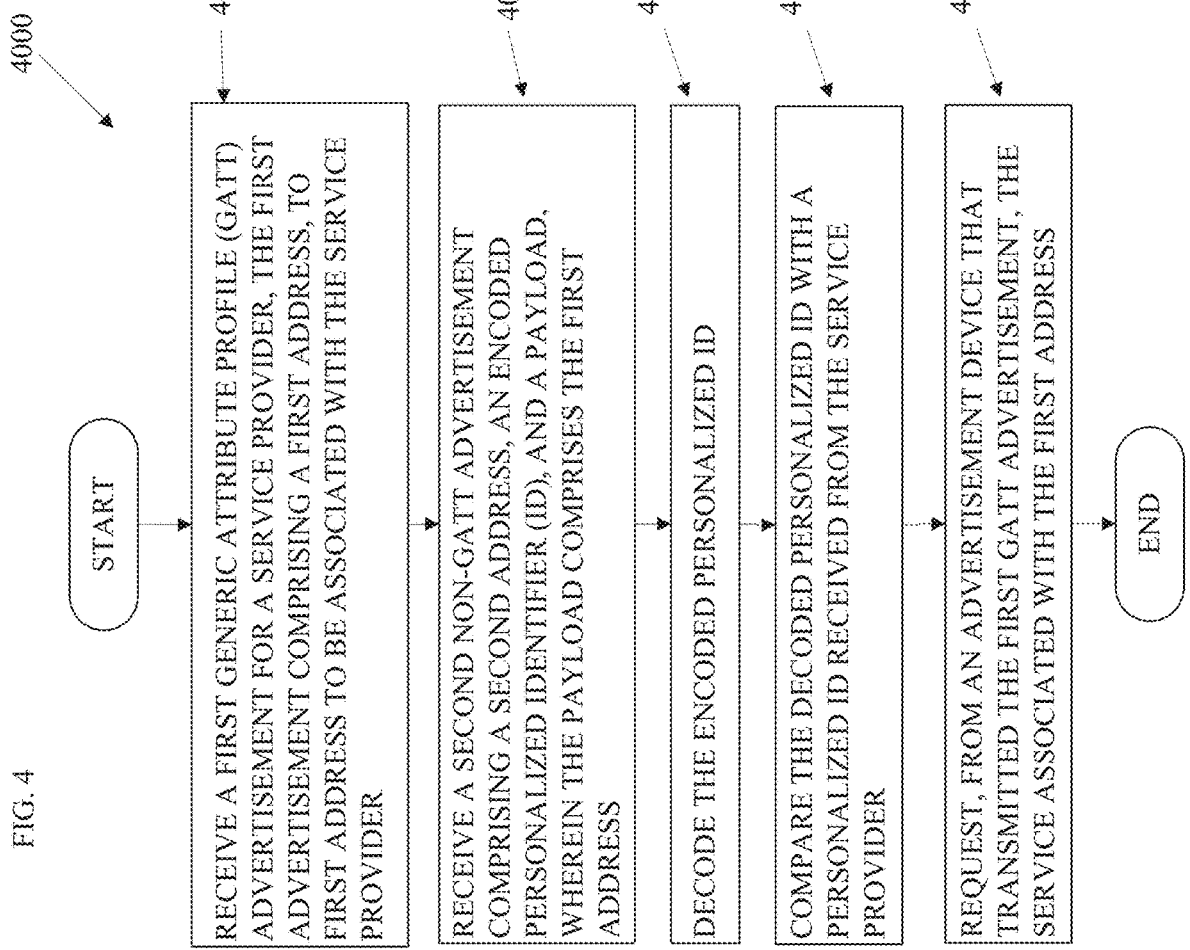
FIG. 4 depicts an embodiment of another flowchart to implement advertisement logic circuitry.

FIG. 4 depicts an embodiment of a flowchart 4000 to implement advertisement logic circuitry such as the advertisement logic circuitry discussed in FIGS. 1-3. At element 4010, advertisement logic circuitry of the advertiser device (e.g., the advertisement logic circuitry 1250 of client 1230 shown FIG. 1B) may receive a first generic attribute profile (GATT) advertisement for a service provider. The first advertisement may comprise a first address that is associated with the service provider. The first address is typically encoded with a security algorithm to prevent tracking by unauthorized entities. In several embodiments, the host application processor of the advertiser may change the value of the first address periodically.

At element 4015, receiving a second non-GATT advertisement comprising a second address, an encoded personalized identifier (ID), and a payload, wherein the payload comprises the first address. In many embodiments, the scanner device may establish a service with the service provider. The service provider may provide the scanner device with an algorithm or an algorithm and a personalized ID to provide the scanner device with a way to recognize the service in a service advertisement.

At element 4020, after the scanner device receives the second non-GATT advertisement, the scanner device may parse the advertisement to obtain the encoded personalized ID. The encoded personalized ID may be scrambled with a security algorithm such as a private key, a symmetric key, a security hash, or via a different security algorithm. In some embodiments, the scanner device may have received a personalized ID (not encoded) from the service provider to compare against a decoded personalized ID. The scanner device may decode the encoded personalized key with the algorithm provided by the service provider.

At element 4025, the scanner device may associate the decoded personalized ID with the service provider by, e.g., comparing the decoded personalized ID with a personalized ID received from the service provider.

After determining that the decoded personalized key is associated with the service provider, at element 4030, the scanner device may request, from an advertisement device that transmitted the first GATT advertisement, the service associated with the first address. In many embodiments, the scanner device may decode the second non-GATT advertisement, decode the encoded personalized ID to determine that the advertisement is for the service provider, parse the first address from the payload, and wait to receive an advertisement that includes the first address.

In other embodiments, the scanner device may receive an algorithm from the service provider to determine if the personalized ID is associated with the service provider. For instance, the scanner device may perform the algorithm on the personalized key and, if the algorithm produces a certain value or one value of a certain set of values, the personalized key is associated with the service provider.

Figure 5:
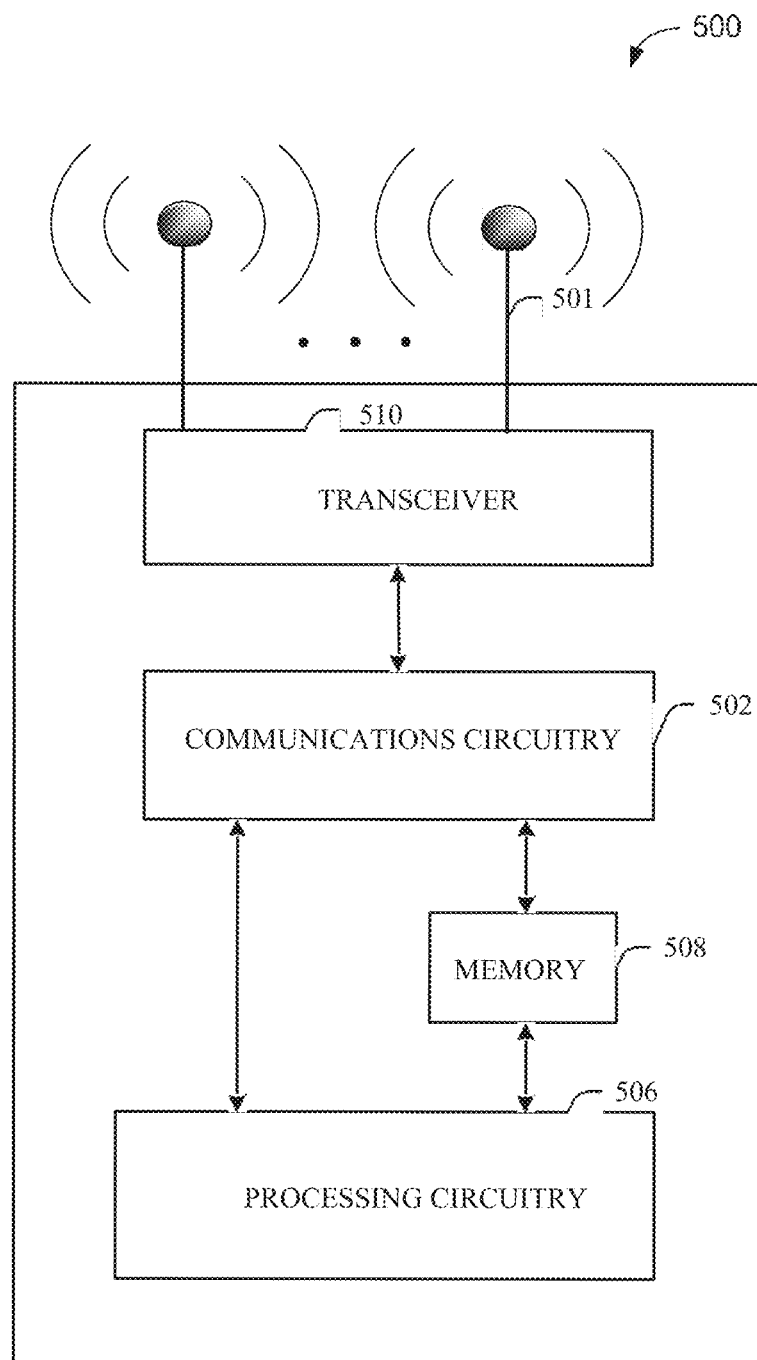
FIG. 5 depicts an embodiment of a functional diagram of a wireless communication device, in accordance with one or more example embodiments of the present disclosure.

FIG. 5 shows a functional diagram of an exemplary communication station 500, in accordance with one or more example embodiments of the present disclosure. In one embodiment, FIG. 5 illustrates a functional block diagram of an advertisement device or scanner device that may be suitable for use as an AP 1005 (FIG. 1A) or one of the user devices, such as the tablet 1029 (FIG. 1A) in accordance with some embodiments. The communication station 500 may also be suitable for use as other user device(s) 1020 such as the user devices 1024, 1025, 1026, 1027, and/or 1028. The user devices 1024, 1025, 1026, 1027, 1028, and/or 1029 may include, e.g., a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or link layer communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

Figure 6:
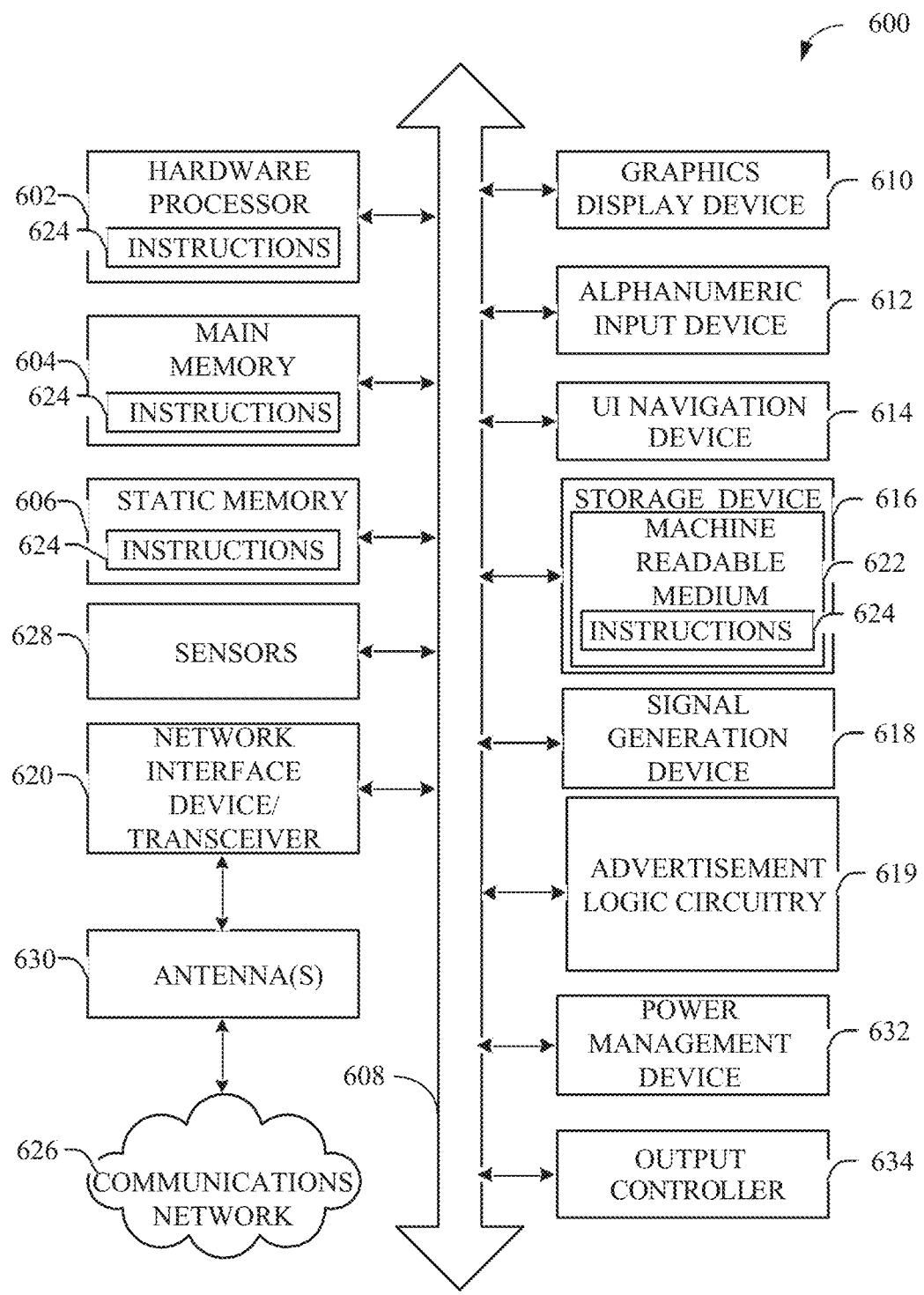
FIG. 6 depicts an embodiment of a block diagram of a machine upon which any of one or more techniques may be performed, in accordance with one or more embodiments.

FIG. 6 illustrates a block diagram of an example of a machine 600 or system upon which any one or more of the techniques (e.g., methodologies) discussed herein may be performed. For instance, the machine may comprise an AP such as the AP 1005 and/or one of the user devices 1020 shown in FIG. 1A. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via one or more interlinks (e.g., buses or high speed interconnects) 608. Note that the single set of interlinks 608 may be representative of the physical interlinks in some embodiments but is not representative of the physical interlinks 608 in other embodiments. For example, the main memory 604 may couple directly with the hardware processor 602 via high speed interconnects or a main memory bus. The high speed interconnects typically connect two devices, and the bus is generally designed to interconnect two or more devices and include an arbitration scheme to provide fair access to the bus by the two or more devices.

The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an advertisement logic circuitry 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor such as the baseband processing circuitry 1218 and/or 1248 shown in FIG. 1C. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the advertisement logic circuitry 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The advertisement logic circuitry 619 may carry out or perform any of the operations and processes in relation to connection between an advertiser device and a scanner device to facilitate advertisement, discovery, and selection of a service from a service provider or the like (e.g., flowchart 3000 shown in FIG. 3, and flowchart 4000 shown in FIG. 4) described and shown above. It is understood that the above are only a subset of what the advertisement logic circuitry 619 may be configured to perform and that other functions included throughout this disclosure may also be performed by the advertisement logic circuitry 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
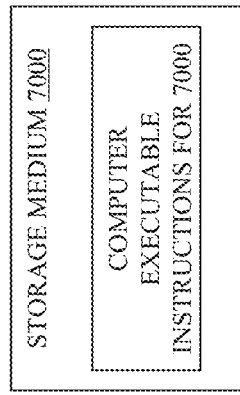
FIGS. 7-8 depict embodiments of a computer-readable storage medium and a computing platform to implement advertisement logic circuitry.

FIG. 7 illustrates an example of a storage medium 7000 to store assessment logic such as logic to implement the advertisement logic circuitry 619 shown in FIG. 6 and/or the other logic discussed herein service advertisement and discovery. Storage medium 7000 may comprise an article of manufacture. In some examples, storage medium 7000 may include any non-transitory computer readable medium or machine-readable medium, such as an optical, magnetic or semiconductor storage. Storage medium 7000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 8:
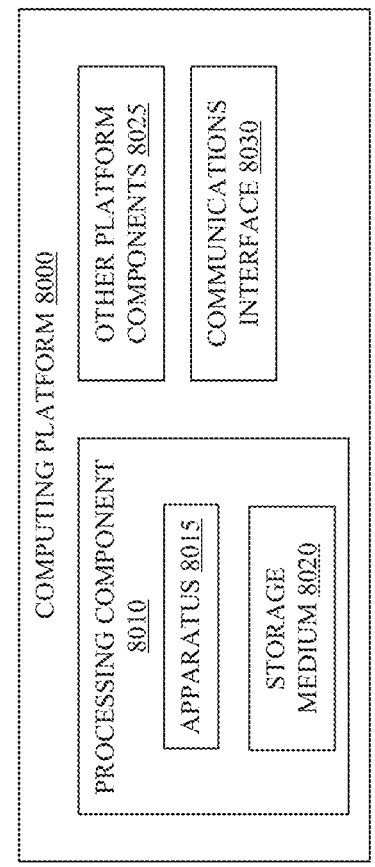

FIG. 8 illustrates an example computing platform 8000 such as the advertiser device 1210 and scanner device 1230 in FIG. 1B. In some examples, as shown in FIG. 8, computing platform 8000 may include a processing component 8010, other platform components or a communications interface 8030 such as the wireless network interfaces 1222 and 1252 shown in FIG. 1A. According to some examples, computing platform 8000 may be a computing device such as a server in a system such as a data center or server farm that supports a manager or controller for managing configurable computing resources as mentioned above.

According to some examples, processing component 8010 may execute processing operations or logic for apparatus 8015 described herein. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 8020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a workstation, a mini-computer, a main frame computer, a supercomputer, a network appliance, a web appliance, a distributed computing system, multiprocessor systems, processor-based systems, or combination thereof. Accordingly, various embodiments of the computing platform 8000 may include or exclude functions and/or specific configurations of the computing platform 8000 described herein.

The components and features of computing platform 8000 may comprise any combination of discrete circuitry, ASICs, logic gates and/or single chip architectures. Further, the features of computing platform 8000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

ADVANTAGES OF SOME EMBODIMENTS

Several embodiments have one or more potentially advantages effects. For instance, use of advertisement logic circuitry, advantageously allows to send long unique device ID, that cannot fit in usual GATT advertisement packet. Use of advertisement logic circuitry advantageously allows to use GATT server solution for actual device-to-device communication. Use of advertisement logic circuitry is advantageously based on basic LE primitives and can be implemented on majority of LE ecosystem devices. Use of advertisement logic circuitry advantageously offers legacy BT operation for, e.g., smartphones and PCs, with a software upgrade. Use of advertisement logic circuitry advantageously allows battery power reduction by both advertiser and scanner as it does not require both to establish connection when not necessary.

EXAMPLES OF FURTHER EMBODIMENTS

The following examples pertain to further embodiments. Specifics in the examples may be used anywhere in one or more embodiments.

Example 1 is an apparatus comprising: a memory; and logic circuitry of an advertiser device coupled with the memory to: cause transmission of a first generic attribute profile (GATT) advertisement for a service provider, the first advertisement comprising a first address, to first address to be associated with the service provider; generate, via a Bluetooth host controller, a second non-GATT advertisement comprising a second address, an encoded personalized identifier (ID), and a payload, wherein the payload comprises the first address; cause transmission, via the Bluetooth host controller, of the second non-GATT advertisement; and receive, from a scanner device, a request for the service associated with the first address. Example 2 is the apparatus of Example 1, wherein the logic circuitry comprises baseband processing circuitry and further comprising a radio coupled with the baseband processing circuitry, and one or more antennas coupled with the radio to transmit a BT frame. Example 3 is the apparatus of Example 1, the logic circuitry to further establish an advertising service for the service provider. Example 4 is the apparatus of Example 3, the logic circuitry to further generate the second address, wherein generation of the second address comprises generation of a random number. Example 5 is the apparatus of Example 1, the logic circuitry to further periodically, via the host application processor, change a value of the first address. Example 6 is the apparatus of Example 5, the logic circuitry to detect the change in the first address and to generate a new value for the encoded personalized ID in accordance with an algorithm provided by the service provider. Example 7 is the apparatus of Example 6, the logic circuitry to detect the change in the first address associated with the service provider and, in response, to generate a new value for the encoded personalized ID in accordance with an algorithm provided by the service provider. Example 8 is the apparatus of Example 7, the logic circuitry to further generate a new value for the second address in response to detection of the change in the value of the first address.

Example 9 is a non-transitory computer-readable medium, comprising instructions, which when executed by a processor, cause the processor to perform operations to: cause transmission of a first generic attribute profile (GATT) advertisement for a service provider, the first advertisement comprising a first address, to first address to be associated with the service provider; generate, via a Bluetooth host controller, a second non-GATT advertisement comprising a second address, an encoded personalized identifier (ID), and a payload, wherein the payload comprises the first address; cause transmission, via the Bluetooth host controller, of the second non-GATT advertisement; and receive, from a scanner device, a request for the service associated with the first address. Example 10 is the non-transitory computer-readable medium of Example 9, the operations to further establish an advertising service for the service provider. Example 11 is the non-transitory computer-readable medium of Example 10, the operations to further generate the second address, wherein generation of the second address comprises generation of a random number. Example 12 is the non-transitory computer-readable medium of Example 9, the operations to further periodically, via the host application processor, change a value of the first address e. Example 13 is the non-transitory computer-readable medium of Example 12, the operations to detect the change in the first address and to generate a new value for the encoded personalized ID in accordance with an algorithm provided by the service provider. Example 14 is the non-transitory computer-readable medium of Example 9, the operations to detect the change in the first address associated with the service provider and, in response, to generate a new value for the encoded personalized ID in accordance with an algorithm provided by the service provider. Example 15 is the non-transitory computer-readable medium of Example 9, the operations to further generate a new value for the second address in response to detection of the change in the value of the first address.

Example 16 is a method comprising: causing transmission of a first generic attribute profile (GATT) advertisement for a service provider, the first advertisement comprising a first address, to first address to be associated with the service provider; generating, via a Bluetooth host controller, a second non-GATT advertisement comprising a second address, an encoded personalized identifier (ID), and a payload, wherein the payload comprises the first address; causing transmission, via the Bluetooth host controller, of the second non-GATT advertisement; and receiving, from a scanner device, a request for the service associated with the first address. Example 17 is the method of Example 16, further comprising establishing an advertising service for the service provider. Example 18 is the method of Example 17, further comprising generating the second address, wherein generation of the second address comprises generation of a random number. Example 19 is the method of Example 16, further comprising periodically, via the host application processor, changing a value of the first address. Example 20 is the method of Example 19, further comprising detecting the change in the first address and, in response, generating a new value for the encoded personalized ID in accordance with an algorithm provided by the service provider. Example 21 is the method of Example 16, further comprising detecting the change in the first address associated with the service provider and, in response, generating a new value for the encoded personalized ID in accordance with an algorithm provided by the service provider. Example 22 is the method of Example 16, further comprising generating a new value for the second address in response to detection of the change in the value of the first address.

Example 23 is an apparatus comprising: a means for causing transmission of a first generic attribute profile (GATT) advertisement for a service provider, the first advertisement comprising a first address, to first address to be associated with the service provider; a means for generating, via a Bluetooth host controller, a second non-GATT advertisement comprising a second address, an encoded personalized identifier (ID), and a payload, wherein the payload comprises the first address; a means for causing transmission, via the Bluetooth host controller, of the second non-GATT advertisement; and a means for receiving, from a scanner device, a request for the service associated with the first address. Example 24 is the apparatus of Example 23, further comprising a means for establishing an advertising service for the service provider. Example 25 is the apparatus of Example 24, further comprising a means for generating the second address, wherein generation of the second address comprises generation of a random number. Example 26 is the apparatus of Example 23, further comprising a means for periodically, via the host application processor, changing a value of the first address. Example 27 is the apparatus of Example 26, further comprising a means for detecting the change in the first address and, in response, generating a new value for the encoded personalized ID in accordance with an algorithm provided by the service provider. Example 28 is the apparatus of Example 23, further comprising a means for detecting the change in the first address associated with the service provider and, in response, a means for generating a new value for the encoded personalized ID in accordance with an algorithm provided by the service provider. Example 29 is the apparatus of Example 23, further comprising a means for generating a new value for the second address in response to detection of the change in the value of the first address.

Example 30 is an apparatus comprising: a memory; and logic circuitry of a scanner device coupled with the memory to: receive a first generic attribute profile (GATT) advertisement for a service provider, the first advertisement comprising a first address, to first address to be associated with the service provider; receive a second non-GATT advertisement comprising a second address, an encoded personalized identifier (ID), and a payload, wherein the payload comprises the first address; decode the encoded personalized ID; associate the decoded personalized ID with the service provider; and request, from an advertisement device that transmitted the first GATT advertisement, the service associated with the first address. Example 31 is the apparatus of Example 30, wherein the logic circuitry comprises baseband processing circuitry and further comprising a radio coupled with the baseband processing circuitry, and one or more antennas coupled with the radio to receive a BT frame. Example 32 is the apparatus of Example 30, the logic circuitry to further parse the payload to determine the first address. Example 33 is the apparatus of Example 32, the logic circuitry to further compare the first with the service provider addresses in the first GATT advertisement. Example 34 is the apparatus of Example 30, the logic circuitry to further establish a service with the service provider. Example 35 is the apparatus of Example 30, e logic circuitry to further receive an algorithm from the service provider to decode the personal ID in the first GATT advertisement.

Example 36 is a non-transitory computer-readable medium, comprising instructions, which when executed by a processor, cause the processor to perform operations to: receive a first generic attribute profile (GATT) advertisement for a service provider, the first advertisement comprising a first address, to first address to be associated with the service provider; receive a second non-GATT advertisement comprising a second address, an encoded personalized identifier (ID), and a payload, wherein the payload comprises the first address; decode the encoded personalized ID; associate the decoded personalized ID with the service provider; and request, from an advertisement device that transmitted the first GATT advertisement, the service associated with the first address. Example 37 is the non-transitory computer-readable medium of Example 36, the operations to further parse the payload to determine the first address. Example 38 is the non-transitory computer-readable medium of Example 37, the operations to further compare the first with the service provider addresses in the first GATT advertisement. Example 39 is the non-transitory computer-readable medium of Example 36, the operations to further establish a service with the service provider. Example 40 is the non-transitory computer-readable medium of Example 36, the operations to further receive an algorithm from the service provider to decode the personal ID in the first GATT advertisement.

Example 41 is a method comprising: receiving a first generic attribute profile (GATT) advertisement for a service provider, the first advertisement comprising a first address, to first address to be associated with the service provider; receiving a second non-GATT advertisement comprising a second address, an encoded personalized identifier (ID), and a payload, wherein the payload comprises the first address; decoding the encoded personalized ID; comparing the decoded personalized ID with a personalized ID received from the service provider; and requesting, from an advertisement device that transmitted the first GATT advertisement, the service associated with the first address. Example 42 is the method of Example 41, further comprising parsing the payload to determine the first address. Example 43 is the method of Example 42, further comprising comparing the first with the service provider addresses in the first GATT advertisement. Example 44 is the method of Example 41, further comprising establishing a service with the service provider. Example 45 is the method of Example 41, further comprising receiving an algorithm from the service provider to decode the personal ID in the first GATT advertisement.

Example 46 is an apparatus comprising: a means for receiving a first generic attribute profile (GATT) advertisement for a service provider, the first advertisement comprising a first address, to first address to be associated with the service provider; a means for receiving a second non-GATT advertisement comprising a second address, an encoded personalized identifier (ID), and a payload, wherein the payload comprises the first address; a means for decoding the encoded personalized ID; a means for comparing the decoded personalized ID with a personalized ID received from the service provider; and a means for requesting, from an advertisement device that transmitted the first GATT advertisement, the service associated with the first address. Example 47 is the apparatus of Example 46, further comprising a means for parsing the payload to determine the first address. Example 48 is the apparatus of Example 46, further comprising a means for comparing the first with the service provider addresses in the first GATT advertisement. Example 49 is the apparatus of Example 46, further comprising a means for establishing a service with the service provider. Example 50 is the apparatus of Example 46, further comprising a means for receiving an algorithm from the service provider to decode the personal ID in the first GATT advertisement.

What is claimed is:

1. An apparatus comprising:
   a memory; and
   circuitry of an advertiser device coupled with the memory to:
   cause transmission of a first generic attribute profile (GATT) advertisement for a service provider, the first GATT advertisement comprising a first address, the first address to be associated with the service provider;
   generate, via a Bluetooth host controller, a second non-GATT advertisement comprising a second address, an encoded personalized identifier (ID), and a payload, wherein the payload comprises the first address;
   cause transmission, via the Bluetooth host controller, of the second non-GATT advertisement; and
   receive, from a scanner device, a request for the service associated with the first address.

2. The apparatus of claim 1, wherein the circuitry comprises baseband processing circuitry and further comprising a radio coupled with the baseband processing circuitry, and one or more antennas coupled with the radio to transmit a BT frame.

3. The apparatus of claim 1, the circuitry to further establish an advertising service for the service provider.

4. The apparatus of claim 3, the circuitry to further generate the second address, wherein generation of the second address comprises generation of a random number.

5. The apparatus of claim 1, the circuitry to further periodically, via a host application processor, change a value of the first address.

6. The apparatus of claim 5, the circuitry to detect the change in the first address and to generate a new value for the encoded personalized ID in accordance with an algorithm provided by the service provider.

7. The apparatus of claim 5, the circuitry to detect the change in the first address associated with the service provider and, in response, to generate a new value for the encoded personalized ID in accordance with an algorithm provided by the service provider.

8. The apparatus of claim 7, the circuitry to further generate a new value for the second address in response to detection of the change in the value of the first address.

9. A non-transitory computer-readable medium, comprising instructions, which when executed by a processor, cause the processor to perform operations to:
cause transmission of a first generic attribute profile (GATT) advertisement for a service provider, the first GATT advertisement comprising a first address, the first address to be associated with the service provider;
generate, via a Bluetooth host controller, a second non-GATT advertisement comprising a second address, an encoded personalized identifier (ID), and a payload, wherein the payload comprises the first address;
cause transmission, via the Bluetooth host controller, of the second non-GATT advertisement; and
receive, from a scanner device, a request for the service associated with the first address.

10. The non-transitory computer-readable medium of claim 9, the operations to further establish an advertising service for the service provider.

11. The non-transitory computer-readable medium of claim 10, the operations to further generate the second address, wherein generation of the second address comprises generation of a random number.

12. The non-transitory computer-readable medium of claim 9, the operations to further periodically, via a host application processor, change a value of the first address.

13. The non-transitory computer-readable medium of claim 12, the operations to detect a change in the first address and to generate a new value for the encoded personalized ID in accordance with an algorithm provided by the service provider.

14. The non-transitory computer-readable medium of claim 12, the operations to detect a change in the first address associated with the service provider and, in response, to generate a new value for the encoded personalized ID in accordance with an algorithm provided by the service provider.

15. The non-transitory computer-readable medium of claim 9, the operations to further generate a new value for the second address in response to detection of the change in the value of the first address.

16. An apparatus comprising:
a memory; and
circuitry of a scanner device coupled with the memory to:
receive a first generic attribute profile (GATT) advertisement for a service provider, the first GATT advertisement comprising a first address, the first address to be associated with the service provider;
receive a second non-GATT advertisement comprising a second address, an encoded personalized identifier (ID), and a payload, wherein the payload comprises the first address;
decode the encoded personalized ID;
associate the decoded personalized ID with the service provider; and
request, from an advertisement device that transmitted the first GATT advertisement, the service associated with the first address.

17. The apparatus of claim 16, wherein the circuitry comprises baseband processing circuitry and further comprising a radio coupled with the baseband processing circuitry, and one or more antennas coupled with the radio to receive a BT frame.

18. The apparatus of claim 17, circuitry to further parse the payload to determine the first address.

19. The apparatus of claim 16, the circuitry to further compare the first address with the service provider addresses in the first GATT advertisement.

20. The apparatus of claim 16, the circuitry to further establish a service with the service provider.

21. The apparatus of claim 16, the circuitry to further receive an algorithm from the service provider to decode the personal ID in the first GATT advertisement.

22. A non-transitory computer-readable medium, comprising instructions, which when executed by a processor, cause the processor to perform operations to:
receive a first generic attribute profile (GATT) advertisement for a service provider, the first GATT advertisement comprising a first address, the first address to be associated with the service provider;
receive a second non-GATT advertisement comprising a second address, an encoded personalized identifier (ID), and a payload, wherein the payload comprises the first address;
decode the encoded personalized ID;
associate the decoded personalized ID with the service provider; and
request, from an advertisement device that transmitted the first GATT advertisement, the service associated with the first address.

23. The non-transitory computer-readable medium of claim 22, the operations to further parse the payload to determine the first address.

24. The non-transitory computer-readable medium of claim 23, the operations to further compare the first address with the service provider addresses in the first GATT advertisement.

25. The non-transitory computer-readable medium of claim 22, the operations to further establish a service with the service provider.

* * * * *